United States Patent
Kojima

[11] Patent Number: 5,755,139
[45] Date of Patent: May 26, 1998

[54] BICYCLE SHIFT LEVERS WHICH SURROUND A HANDLEBAR

[75] Inventor: Masao Kojima, Sakai, Japan

[73] Assignee: Shimano, Inc., Osaka, Japan

[21] Appl. No.: 891,364

[22] Filed: Jul. 10, 1997

Related U.S. Application Data

[63] Continuation of Ser. No. 599,985, Feb. 14, 1996, abandoned.

[51] Int. Cl.[6] ................................................... F16H 59/00
[52] U.S. Cl. ........................... 74/475; 74/489; 74/502.2; 74/551.8; 474/81
[58] Field of Search ................. 474/81, 129; 74/502.2, 74/475, 489, 551.8

[56] References Cited

U.S. PATENT DOCUMENTS

| | | | |
|---|---|---|---|
| 3,901,095 | 8/1975 | Wechsler | 74/551.8 X |
| 4,900,291 | 2/1990 | Patterson | 474/80 |
| 4,995,280 | 2/1991 | Tagawa | 74/502.2 X |
| 5,094,120 | 3/1992 | Tagawa | 74/502.2 X |
| 5,102,372 | 4/1992 | Patterson | 474/80 |
| 5,361,645 | 11/1994 | Feng et al. | 74/502.2 |
| 5,421,219 | 6/1995 | Tagawa | 74/502.2 |

FOREIGN PATENT DOCUMENTS

| | | | |
|---|---|---|---|
| 485955 A1 | 5/1992 | European Pat. Off. | B62M 25/04 |
| 589048 A1 | 3/1994 | European Pat. Off. | B62M 25/04 |
| 629545 A1 | 12/1994 | European Pat. Off. | B62M 25/04 |
| 977332 | 3/1951 | France | 10/5 |
| 2700153 | 7/1994 | France | B62K 23/06 |
| 3826635 A1 | 2/1990 | Germany | B62J 6/00 |
| 306743 | 3/1933 | Italy . | |
| 442982 | 12/1948 | Italy . | |
| 29-15230 | 11/1929 | Japan . | |
| 43-11680 | 5/1943 | Japan . | |
| 48-24188 | 7/1973 | Japan . | |
| 52-155739 | 12/1977 | Japan | B62M 25/04 |
| 54-53442 | 4/1979 | Japan | G05G 9/12 |
| 2-225191 | 9/1990 | Japan | B62L 3/02 |
| 4-183696 | 6/1992 | Japan | B62M 25/04 |
| 488002 | 6/1938 | United Kingdom . | |

OTHER PUBLICATIONS

European search report for EP 97300916.0, dated May 27, 1997.

*Primary Examiner*—Roger J. Schoeppel
*Attorney, Agent, or Firm*—James A. Deland

[57] ABSTRACT

A control body is provided for mounting to a bicycle in close proximity to a handlebar for controlling a pulling and releasing of the transmission element. A first lever is mounted to the control body for movement which causes the control body to effect pulling of the transmission element, and a second lever is mounted to the control body for movement which causes the control body to effect releasing of the transmission element. The first lever and the second lever are mounted to the control body so that the handlebar is disposed between the first lever and the second lever when the shifter operating device is mounted to the bicycle. In a first embodiment both levers may be pivotally coupled to the control body for movement in a common plane, and the first lever may be adapted to move in a direction opposite to the movement in the second lever. In a second embodiment one lever may be pivotally coupled to the control body and the other lever may be coupled for linear movement relative to the control body.

16 Claims, 8 Drawing Sheets

BICYCLE SHIFT LEVERS WHICH SURROUND A HANDLEBAR

This is a Continuation of application Ser. No. 08/599,985, filed Feb. 14, 1996, now abandoned.

BACKGROUND OF THE INVENTION

The present invention is directed to a bicycle shifting device which operates a shifter via a shifter cable, and specifically concerns a device in which a take-up body that takes up the shifter cable is caused to rotate in the take-up direction by means of a first shift lever which freely returns to a home position, and is caused to rotate in the pay-out direction by means of a second shift lever which freely returns to a separate home position.

A bicycle shifter operating device equipped with first and second shift levers such as those described above is known (for example) from Japanese Patent Application Kokai No. 4-183696. In this shifter operating device, the first shift lever and the second shift lever can pivot about a common pivoting axis wherein the operating direction of the first shift lever is clockwise and the operating direction of the second shift lever is counterclockwise. The first shift lever is arranged so that it can be operated by the thumb of the hand gripping the handlebar, and the second shift lever is arranged so that it can be operated by the index finger of the hand gripping the handlebar. In such shifting devices the first and second levers typically pivot about an axis that is perpendicular to the handlebar.

During high performance riding on rough terrain it is often desirable to keep the hands as firmly positioned on the handlebars as possible. However, when using the above shifting devices it is necessary to remove the index finger from the handlebar in order to operate the second shift lever. Some cyclists find the movement of the index finger in such cases undesirable.

Some shifting devices are constructed as shown in U.S. Pat. No. 4,900,291 wherein the shifting operation is performed by rotating a sleeve mounted coaxially with the handlebar. Unfortunately, if the hand is maintained in position around the sleeve while riding there is a risk of unintended shifting when encountering rough terrain. If the hand is ordinarily kept in position on the rigid portion of the handlebar, then the entire hand must be removed from the handlebar to grasp the sleeve during shifting, which is even more undesirable. Thus, there is a need for a shifting device which allows the hand to be firmly positioned on the handlebar at all times with a minimum of movement during shifting.

Another ergonomic consideration of shifting devices is the sensory feedback provided by the shifting device. Some cyclists prefer a shifting device which provide very different sensory feedback between the upshifting and downshifting operations. For those cyclists a shifting device with two pivoting levers does not provide sufficient sensory difference between the upshifting and downshifting operation, since both levers pivot. The same is true with shifting devices constructed with a rotating sleeve, since both upshifting and downshifting is performed by rotating the sleeve.

A bicycle shifter operating device in which the first shift lever is operated by pivoting and the second shift lever is operated by means of a button in order to achieve a clear sensory difference between the shifter cable take-up operation and the shifter cable pay-out operation is known from British Patent Disclosure No. 2,169,065 (corresponding to Japanese Patent Application Kokai No. 61-222889). In this shifter operating device, a pivoting lever is used when the take-up body is to be rotated in the direction which takes up the shifter cable. When the take-up body is to be rotated in the direction which pays out the shifter cable (using the driving force of a return spring), the cable is returned one speed at a time by means of a button-operated sliding pawl. Here, the shifter cable take-up operation is accomplished by a pivoting action, while the shifter cable pay-out operation is accomplished by a sliding action.

Accordingly, there is a clear sensory difference between the two operations. Unfortunately, because of structural limitations, the pivoting lever and the button-operated part must be installed in completely different locations. Accordingly, it is difficult to perform both shifting operations using the fingers of the hand gripping the handlebar without undesirable movement of the hand.

SUMMARY OF THE INVENTION

The present invention is directed to a bicycle shifting device which allows the shifting operation to be performed without undesirable movement of the hand and which also can be constructed to provide very different sensory feedback between the upshifting and downshifting operations. In one embodiment of a bicycle shifter operating device according to the present invention for operating a shifter via a transmission element, a control body is provided for mounting to a bicycle in close proximity to a handlebar for controlling a pulling and releasing of the transmission element. A first lever is mounted to the control body for movement which causes the control body to effect pulling of the transmission element, and a second lever is mounted to the control body for movement which causes the control body to effect releasing of the transmission element. The first lever and the second lever are mounted to the control body so that the handlebar is disposed between the first lever and the second lever when the shifter operating device is mounted to the bicycle. Both levers may be operated by the cyclist's thumb without movement of any other fingers or the palm from the handlebar. The control body may be mounted to a bracket used for mounting a brake lever to the bicycle, thus allowing the shifting levers to be placed very close to the brake lever to facilitate shifting while braking. To make a very compact structure the inner surfaces of each lever may be curved so that the levers wrap around the handlebar.

In a first embodiment both levers may be pivotally coupled to the control body for movement in a generally common plane, and the first lever may be adapted to move in a direction opposite to the movement in the second lever. In a second embodiment one lever may be pivotally coupled to the control body and the other lever may be coupled for linear movement relative to the control body. This embodiment maximizes the difference in sensory feedback between upshifting and downshifting (i.e., sliding vs. pivoting) while still allowing the shifting operation to be accomplished without excessively moving the fingers and palm from the handlebar. In both embodiments the levers automatically return to their home positions after shifting has been accomplished.

DETAILED DESCRIPTION OF THE EMBODIMENTS

Figure 1:
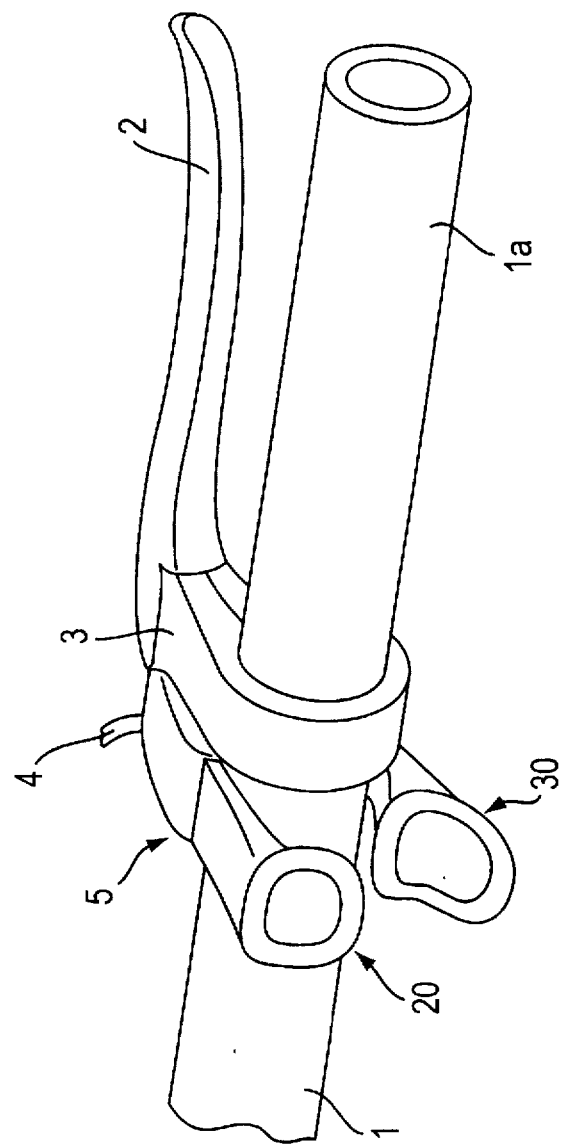
FIG. 1 is a perspective view showing a particular embodiment of a shifter operating device according to the present invention attached to a brake bracket.

FIG. 1 is a perspective view showing a particular embodiment of a shifter operating mechanism according to the present invention. As shown in FIG. 1, a brake bracket 3 which pivotally supports a brake lever 2 is fastened in place adjacent to a grip 1a formed on the handlebar 1 of a bicycle. A shifter operating device 5 which pulls and releases a shifter cable 4 is attached to the side surface of this brake bracket 3. The arm-shaped sliding operating body 20 of the shifter operating device 5 extends above the handlebar 1, and the pivoting operating body 30 of the shifter operating device 5 extends beneath the handlebar 1, so that operation of both levers is possible with the thumb of the hand gripping the handlebar grip 1a.

Figure 2:
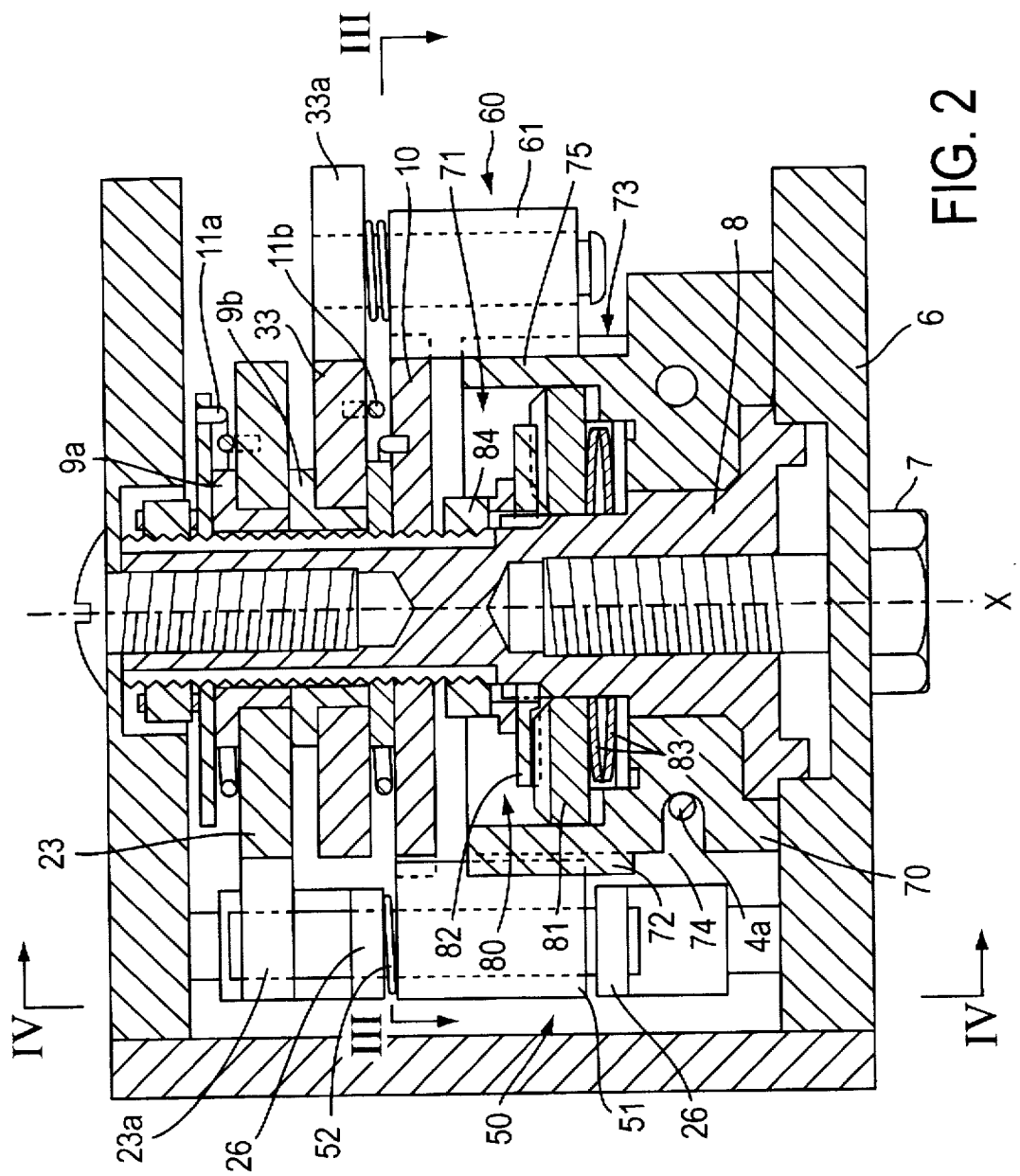
FIG. 2 is a sectional view of the shifter operating device taken along line II—II in FIG. 3.
Figure 3:
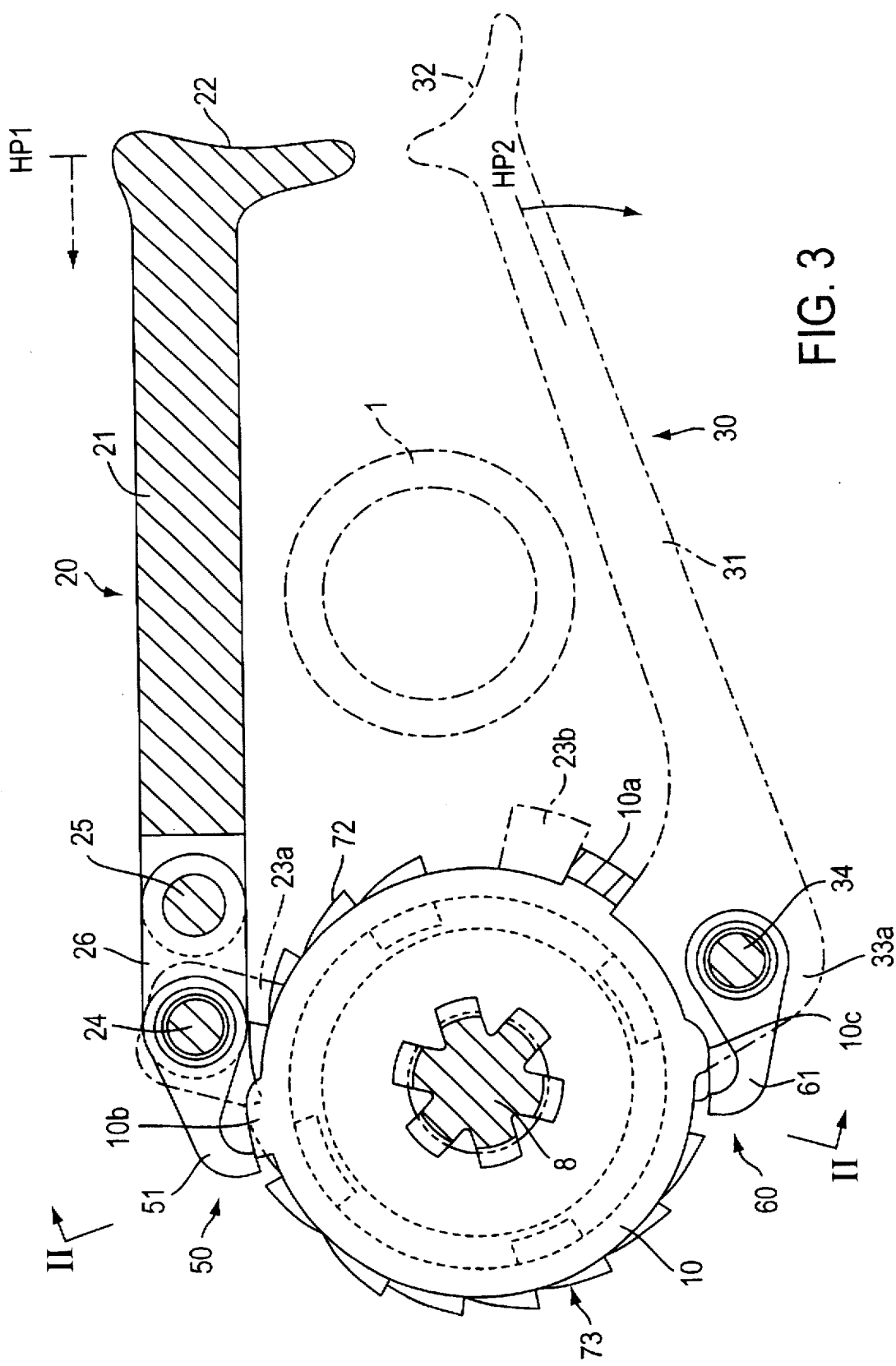
FIG. 3 is a sectional view of the shifter operating device taken along line III—III in FIG. 2.

As is shown in FIGS. 2 and 3, the shifter operating device 5 includes a supporting shaft 8 which is rigidly fastened by means of an attachment bolt 7 to a bracket 6 which, in turn, may be formed as an integral part of the brake bracket 3. A take-up body 70 is attached to the base end of supporting shaft 8, and a positioning mechanism 80 is built into a recessed area 71 formed in take-up body 70. A first ratchet mechanism 50, used as a first transmission means, transmits the displacement of a sliding operating body 20 to the take-up body 70 to cause the rotation of the take-up body 70 in one direction, and a second ratchet mechanism 60, used as a second transmission means, transmits the displacement of a pivoting operating body 30 to the take-up body 70 to cause the rotation of the take-up body 70 in the other direction.

Figure 4:
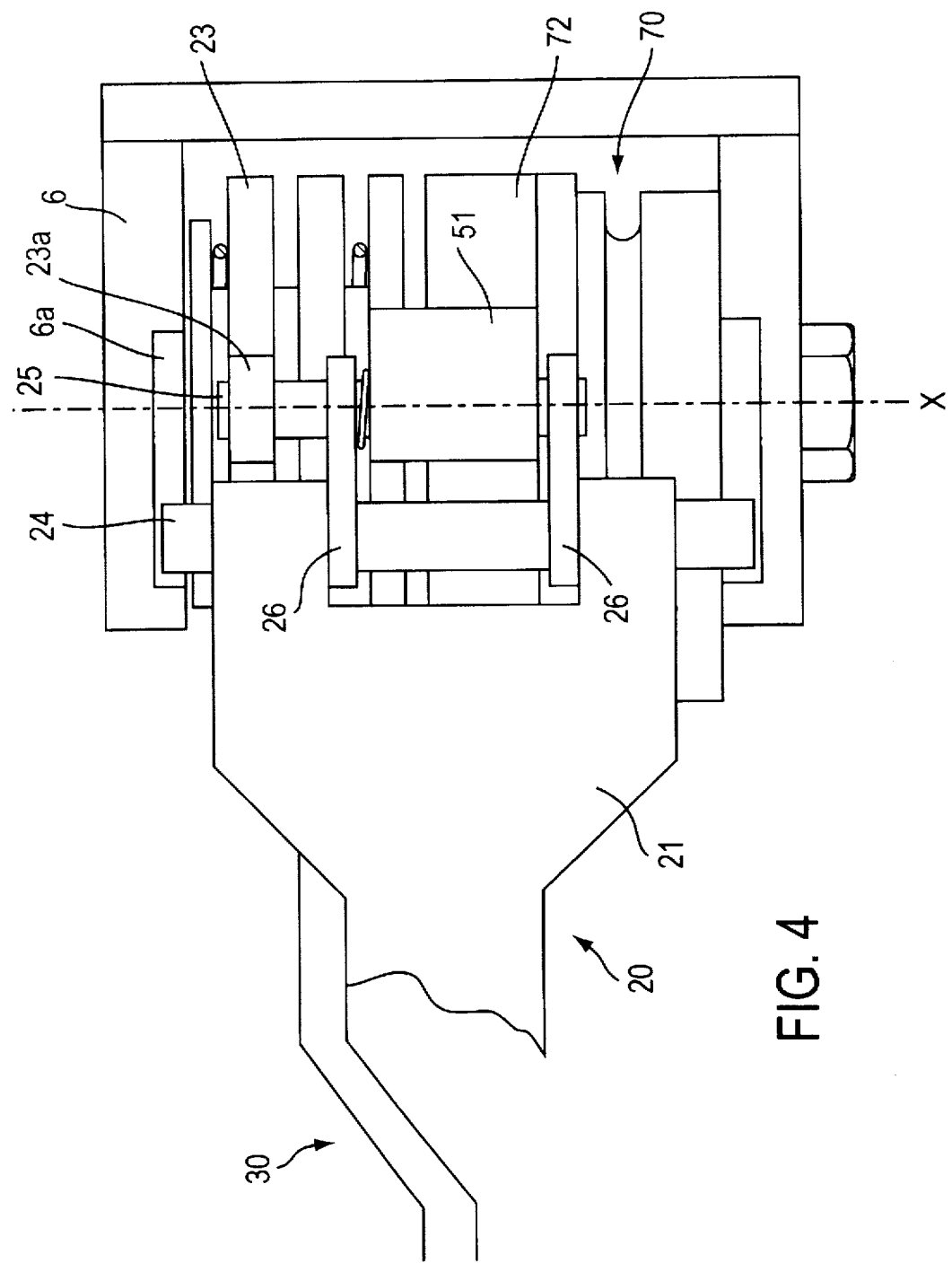
FIG. 4 is a sectional view of the shifter operating device taken along line IV—IV in FIG. 2.

As shown in FIGS. 2, 3 and 4, the sliding operating body 20 is equipped with a first arm part 21 which forms the main part of the sliding operating body, a first finger contact part 22 which is formed on the tip of the first arm part 21 in order to allow finger operation, a rotating plate 23 (constituting a root part) which is supported on the supporting shaft 8 so that the plate 23 can rotate about the supporting shaft 8, and a pair of link members 26 which link the first arm part 21 with a projecting part 23a of the rotating plate 23 via pivot pins 24 and 25. The pivoting operating body (30) is equipped with a second arm part 31 which forms the main part of the pivoting operating body, a second finger contact part 32 which is formed on the tip of the second arm part 31 in order to allow finger operation, and a rotating plate 33 (constituting a root part) which is supported on the supporting shaft 8 so that the plate 33 can rotate about the supporting shaft 8.

The first ratchet mechanism 50 is equipped with a first feeding pawl 51 which is rotatably attached to the pivot pin 24, a first ratchet part 72 which is formed on the outer circumferential surface of the take-up body 70 so that the ratchet part 72 can engage with the feeding pawl 51, and a spring 52 which drives the first feeding pawl 51 in the direction of engagement. The second ratchet mechanism 60 is equipped with a second feeding pawl 61 which is rotatably attached to a pivot pin 34 installed on the transitional part 33a between the rotating plate 33 and second arm part 31, a second ratchet part 73 which is formed on the outer circumferential surface of the take-up body 70 so that the ratchet part 73 can engage with the feeding pawl 61, and a spring 62 which drives the second feeding pawl 61 in the direction of engagement.

The take-up body 70 is equipped with a drum part which is constructed so that the inner wire 4a of the shifter cable 4 from a shifter (not shown) on the front or rear of the bicycle is taken up along a wire groove 74. By rotating in the forward direction or reverse direction with respect to the supporting shaft 8, the take-up body 70 takes up or pays out the inner wire 4a.

As is shown in FIG. 4, the first arm part 21 of the sliding operating body 20 is linked with the rotating plate 23 by means of the link members 26 and pivot pin 24. Both ends of the pivot pin 24 are extended, and the extended end portions are inserted into grooves 6a formed in the bracket 6. Accordingly, the first arm part 21 is guided by the grooves 6a, and performs a linear sliding motion. As a result of this sliding motion, the rotating member 23, which is pivotably fit over the supporting shaft 8 via a bush 9a, is caused to pivot about the axial center X of the supporting shaft 8.

Figure 5:
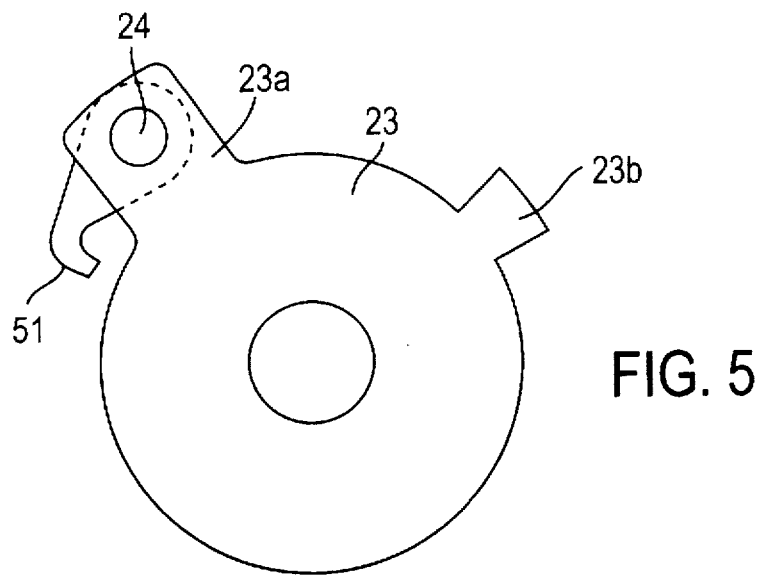
FIG. 5 is a side view of a particular embodiment of a rotating plate of the sliding operating body shown in FIG. 3.

As shown in FIG. 5, the rotating plate 23 has a projection 23b which projects radially outward. This projection 23b is designed so that it will contact one side surface of a stopper 10a formed by bending a circumferential projecting part 10a of a cam member 10 which is attached to the supporting shaft 8 in the pivoting track of the projection 23b. Rotating plate 23 is driven by a return spring 11a in the direction which causes contact between the projection 23 and the stopper 10a. The position in which the projection 23b and stopper 10a are in contact with each other constitutes the home position HP1 of the rotating plate 23 and the sliding operating body 20. The sliding operating body 20 is operated with this home position as a starting point.

Figure 6:
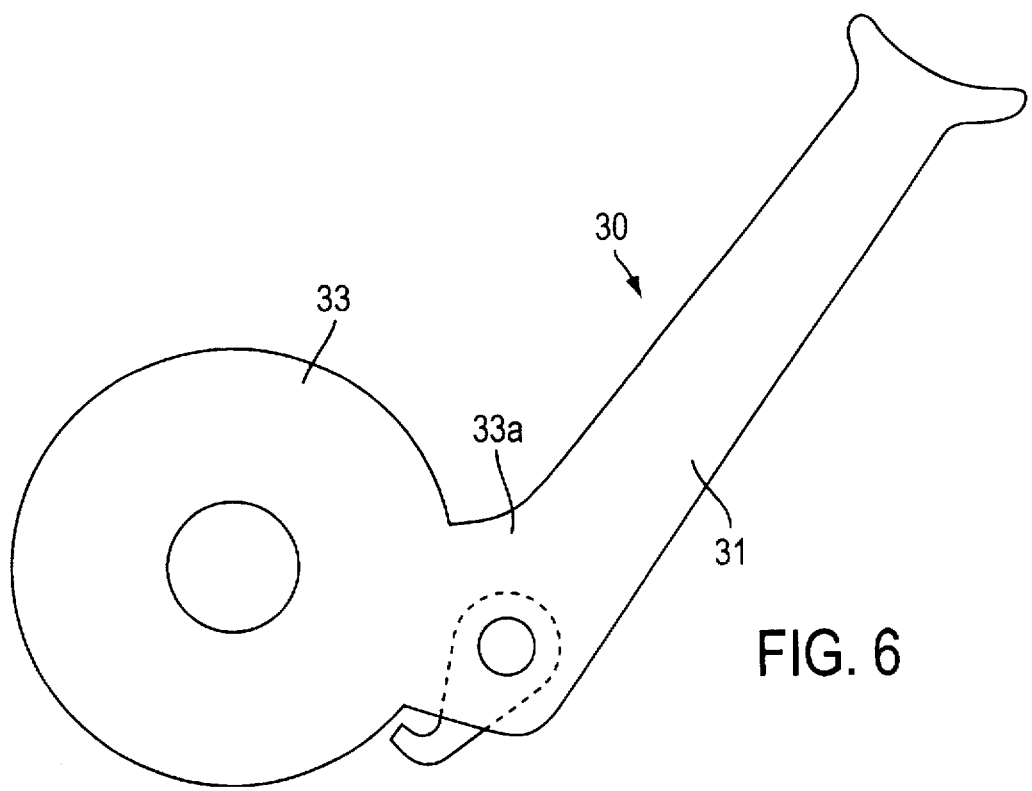
FIG. 6 is a side view of a particular embodiment of the pivoting operating body shown in FIG. 3.

In the case of the pivoting operating body 30, as is shown in FIG. 6, the second arm part 31, second finger contact part 32 and rotating plate 33 (which constitutes the second root part) are formed as an integral unit, and the rotating plate 33 is pivotably fit over the supporting shaft 8 via a bush 9b. Accordingly, when the second finger contact part 32 is pressed, the rotating plate 33 pivots about the axial center X of the supporting shaft 8. The transitional part between the second arm part 31 and the rotating plate 33, I. e., the root of the second arm part 31, is designed so that it contacts the other side surface of the stopper 10a formed by a portion of the cam member 10 in the pivoting track of the root of the second arm part 31. Furthermore, the second arm part 31 is driven by a return spring 11b in the direction which causes contact between the second arm part 31 and the stopper 10a. The position in which the second arm part 31 and stopper 10a are in contact with each other constitutes the home position HP2 of the rotating plate 33 and operating body 30. The pivoting operating body 30 is operated with this home position as a starting point.

Regardless of any restrictions on the attachment position of the take-up body (70), the first and second finger contact parts (22.32) can easily be set in positions which are convenient for the fingers of the hand gripping the handlebar grip, since the finger contact parts (22.32) are located in positions distant from the take-up body. Furthermore, if the system is constructed so that the first finger contact part (22) is displaced in substantially the same plane as the plane of the pivoting track of the second finger contact part (32), I. e., if the first finger contact part (22) is positioned on a line constituting a direct extension of the pivoting range of the second finger contact part (32), then the two operating bodies can be operated by a bending motion and a pivoting motion of the thumb of the hand gripping the handlebar grip. Here, the above expression to the effect that "the first finger contact part (22) is displaced in substantially the same plane as the plane of the pivoting track of the second finger contact part (32)" is to be interpreted merely as indicating that there is no great expansion in the direction of width of the first finger contact part (22) and second finger contact part (32) regardless of how said finger contact parts are displaced. In other words, this expression is not to be interpreted in a strict mathematical sense. As a result of such an arrangement, two motions of the thumb which are desirable from the standpoint of human engineering can be utilized for shifting operations.

When the sliding operating body 20 is positioned in the home position HP1, the tip of the first feeding pawl 51 rides up on a first cam part 10b formed on the circumference of the cam member 10. Accordingly, as a result of being pushed upward by the first cam part 10b of the cam member 10, the first feeding pawl 51 is released from the first ratchet part 72, so that rotation of the take-up body 70 by the pivoting operating body 30 is made possible. When the sliding operating body 20 slides in the direction indicated by the arrow from the home position HP1, the first feeding pawl 51 is released from the first cam part 10b and is caused to pivot toward the first ratchet part 72 by the driving force of the first pawl spring 52. Thereafter, the feeding pawl 51 engages with one of the plurality of ratchet teeth of the first ratchet part 72, thus coupling the sliding operating body 20 and the take-up body 70 so that the bodies rotate as a unit. When the sliding operating body 20 moves from a prescribed shift operating position to the home position HP1, the first feeding pawl 51 is pushed upward by the shape of the ratchet teeth of the first ratchet part 72, so that the engagement of the first feeding pawl 51 with the first ratchet part 72 is automatically released. Accordingly, when the sliding operating body 20 moves from the home position HP1 to the shift operating position, the first ratchet mechanism 50 transmits the sliding displacement of the sliding operating body 20 to the take-up body 70 to cause a take-up rotational operation of the take-up body 70. Thereafter, when the sliding operating body 20 slides from the shift operating position to the home position HP1, the engagement between the first feeding pawl 51 and the first ratchet part 72 is released, thus making it possible for the sliding operating body 20 to return to the home position HP1 while the take-up body 70 remains in a prescribed shift position.

When the pivoting operating body 30 is positioned in the home position HP2, the tip of the second feeding pawl 61 rides up on a second cam part 10c formed on the circumference of the cam member 10. Accordingly, as a result of being pushed upward by the second cam part 10c of the cam member 10, the second feeding pawl 61 is released from the second ratchet part 73, so that rotation of the take-up body 70 by the sliding operating body 20 is made possible. When the pivoting operating body 30 pivots in the direction indicated by the arrow from the home position HP2, the second feeding pawl 61 is released from the second cam part 10c and is caused to pivot toward the second ratchet part 73 by the driving force of the second pawl spring 62. Thereafter, the feeding pawl 61 engages with one of the plurality of ratchet teeth of the second ratchet part 73, thus coupling the pivoting operating body 30 and the take-up body 70 so that the bodies rotate as a unit. When the pivoting operating body 30 pivots from a prescribed shift operating position to the home position HP2, the second feeding pawl 61 is pushed upward by the shape of the ratchet teeth of the second ratchet part 73, so that the engagement of the second feeding pawl 61 with the ratchet part 72 is automatically released. Accordingly, when the pivoting operating body 30 pivots from the home position HP2 to the shift operating position, the second ratchet mechanism 60 transmits the pivoting displacement of the pivoting operating body 30 to the take-up body 70 to cause a pay out rotational operation of the take-up body 70. Thereafter, when the pivoting operating body 30 pivots from the shift operating position to the home position HP2, the engagement between the second feeding pawl 61 and the second ratchet part 73 is released, thus making it possible for the pivoting operating body 30 to return to the home position HP2 while the take-up body 70 remains in a prescribed shift position.

Figure 7:
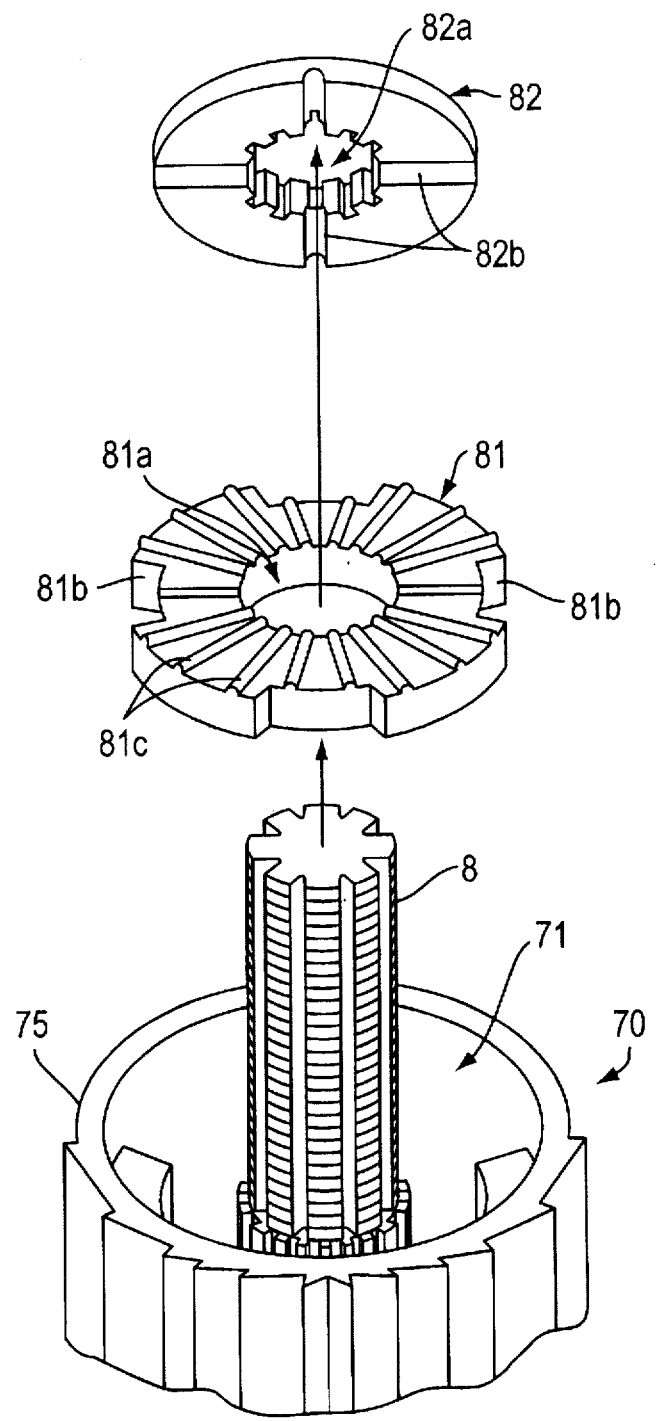
FIG. 7 is an exploded perspective view of a particular embodiment of a positioning mechanism according to the present invention.

The positioning mechanism 80 is constructed from a first positioning plate 81 and second positioning plate 82 which are fit over the supporting shaft 8 inside the take-up body 70, and a pair of coned disk springs 83 which are fit over the supporting shaft 8 between the first positioning plate 81 and the bottom surface of a recessed part 71. As shown in FIG. 7, a circular through-hole 81a is formed in the central portion of the first positioning plate 81, and spline projections 81b are formed on the circumference of the first positioning plate 81. This through-hole 81a is used to fit the first positioning plate 81 over the supporting shaft 8, and the spline projections 81b are inserted into the spaces between a plurality of radially oriented projecting parts formed on the inside circumferential surface of a tube-form part 75 which forms the recessed part 71 of the take-up body 70. Thus, the first positioning plate 81 can slide along the supporting shaft 8 and rotates as a unit with the take-up body 70. The second positioning plate 82 is spline-engaged with the supporting shaft 8 by means of a spline hole 82a, and the second positioning plate 82 is positioned with respect to its upper limit by means of a tightening nut 84 via a spacer 85.

Coned disk springs 83 drive the first positioning plate 81 toward the second positioning plate 82 so that a plurality of projecting strips 81c formed on the first positioning plate 81 respectively enter a plurality of recessed grooves 82b formed in the second positioning plate 82. When the positioning mechanism 80 is in this engaged state, the second positioning plate 82 fastened to the supporting shaft 8 stops the rotation of the take-up body 70 via the first positioning plate 81. However, when the take-up body 70 is caused to pivot by an operating force which exceeds a set force determined by the spring force of the coned disk springs 83, the first positioning plate 81 slides away from the second positioning plate 82 against the force of the coned disk springs 83, so that the engaged state is switched to a disengaged state in which the projecting strips 81c slip out of the recessed grooves 82b formed in the second positioning plate 82, thus allowing rotation of the take-up body 70. In other words, when an operating force exceeding the set force is applied, the positioning mechanism 80 assumes a disengaged state so that the take-up body 70 can rotate. Afterward, the positioning mechanism 80 positions the take-up body 70 in the prescribed shift position by again switching from a disengaged state to an engaged state.

The shifting operation of this shifter operating device 5 will be described below with reference to FIG. 3.

When the thumb of the hand gripping the handlebar grip is contacts the first finger contact part 22 and the sliding operating body 20 is caused to slide from the home position HP1 in the direction indicated by the arrow, I. e., toward the shift position, the first ratchet mechanism 50 transmits the sliding displacement of the sliding operating body 20 as a rotational displacement of the take-up body 70. As a result, the positioning mechanism 80 assumes a disengaged state, and the take-up body 70 rotates toward the take-up side so that the inner wire 4a is taken up. When the take-up body 70 reaches a prescribed shift position, the sliding operation of the sliding operating body 20 is stopped. At this point, the take-up body 70 is in a new shift position which is the target position of the shifting operation, so that the take-up of a prescribed length of the inner wire 4a is completed. At the same time, the positioning mechanism 80 switches from a disengaged state to an engaged state, so that the take-up body 70 is maintained in the new shift position. Meanwhile, the sliding operating body 20 is automatically returned to its home position HP1 by the return spring 11a. As a result, the first finger contact part 22 and second finger contact part 32 are again located adjacent to each other as shown in FIG. 3.

When the thumb of the hand gripping the handlebar grip contacts the second finger contact part 32 and the pivoting operating body 30 is caused to slide from the home position HP2 in the direction indicated by the arrow, the second ratchet mechanism 60 transmits the pivoting displacement of the pivoting operating body 30 as a rotational displacement of the take-up body 70. As a result, the positioning mechanism 80 assumes a disengaged state, and the take-up body 70 rotates toward the pay-out side so that the inner wire 4a is paid out. When the take-up body 70 reaches a prescribed shift position, the pivoting operation of the pivoting operating body 30 is stopped. At this point, the take-up body 70 is in a new shift position which is the target position of the shifting operation, so that the pay-out of a prescribed length of the inner wire 4a is completed. At the same time, the positioning mechanism 80 switches from a disengaged state to an engaged state, so that the take-up body 70 is maintained in the new shift position. Meanwhile, the pivoting operating body 30 is automatically returned to its home position HP1 by the return spring 11b. As a result, the first finger contact part 22 and second finger contact part 32 are again located adjacent to each other as shown in FIG. 3.

In regard to the positioning mechanism 80 which maintains the position of the take-up body 70, it would also be possible to use a means in which this positioning is accomplished by friction between a positioning member on the fixed side and a positioning member on the take-up body side, instead of using a construction in which the positioning is accomplished by engaging means as in the embodiment described above. Furthermore, it would also be possible to use a so-called "index shifting mechanism" in which shifting one speed at a time is realized by means of a pivoting anchoring pawl which acts to link the sliding operating body 20 and pivoting operating body 30. In other words, the term "positioning mechanism 80" use here may refer to any universally known mechanism for temporarily maintaining the position of the take-up body 70.

Figure 8:
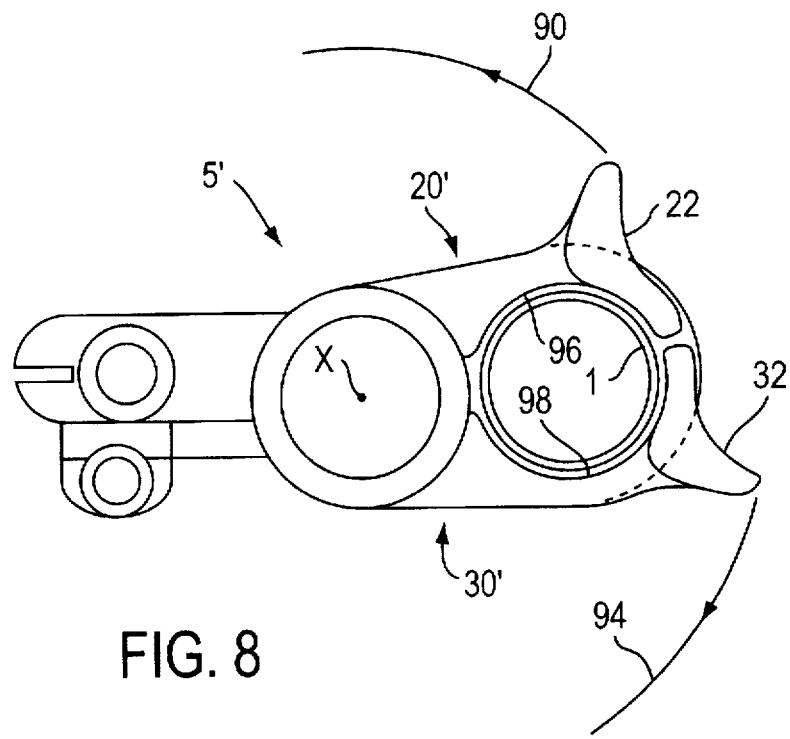
FIG. 8 is a side view of an alternative embodiment of a shifter operating device according to the present invention.
Figure 10:
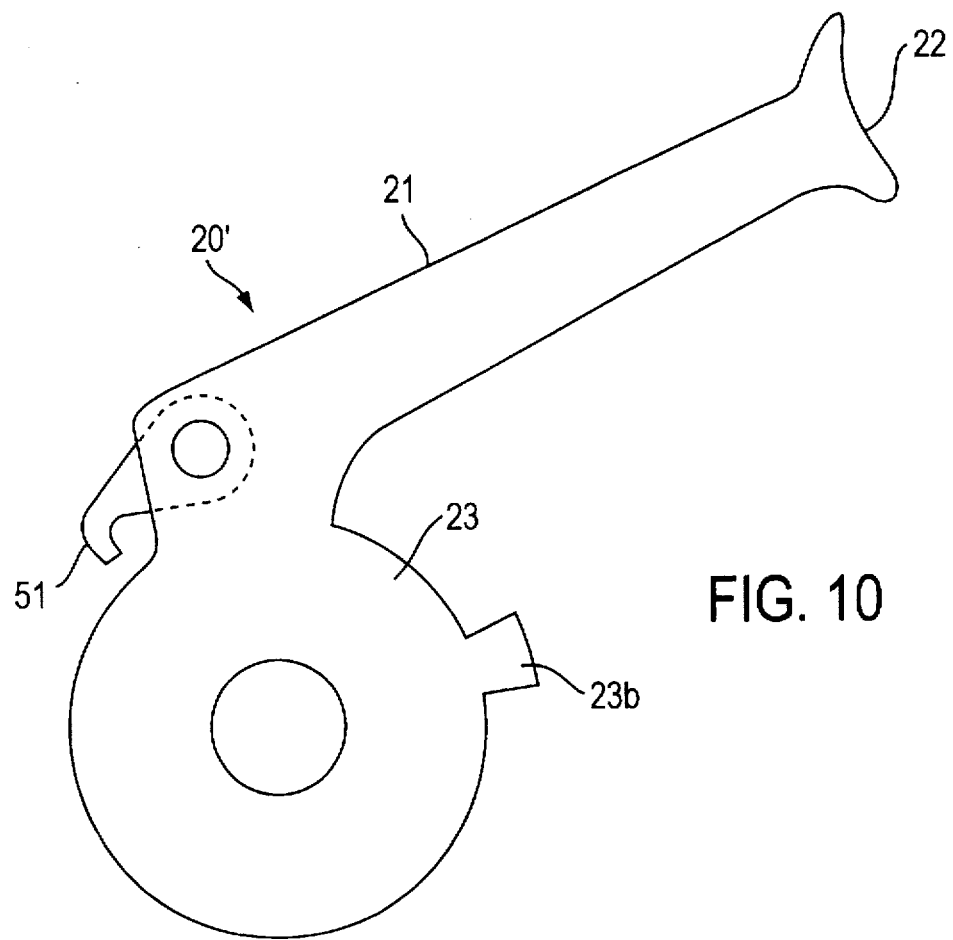
FIG. 10 is a side view of a particular embodiment of a pivoting operating body shown in FIG. 8.
Figure 9:
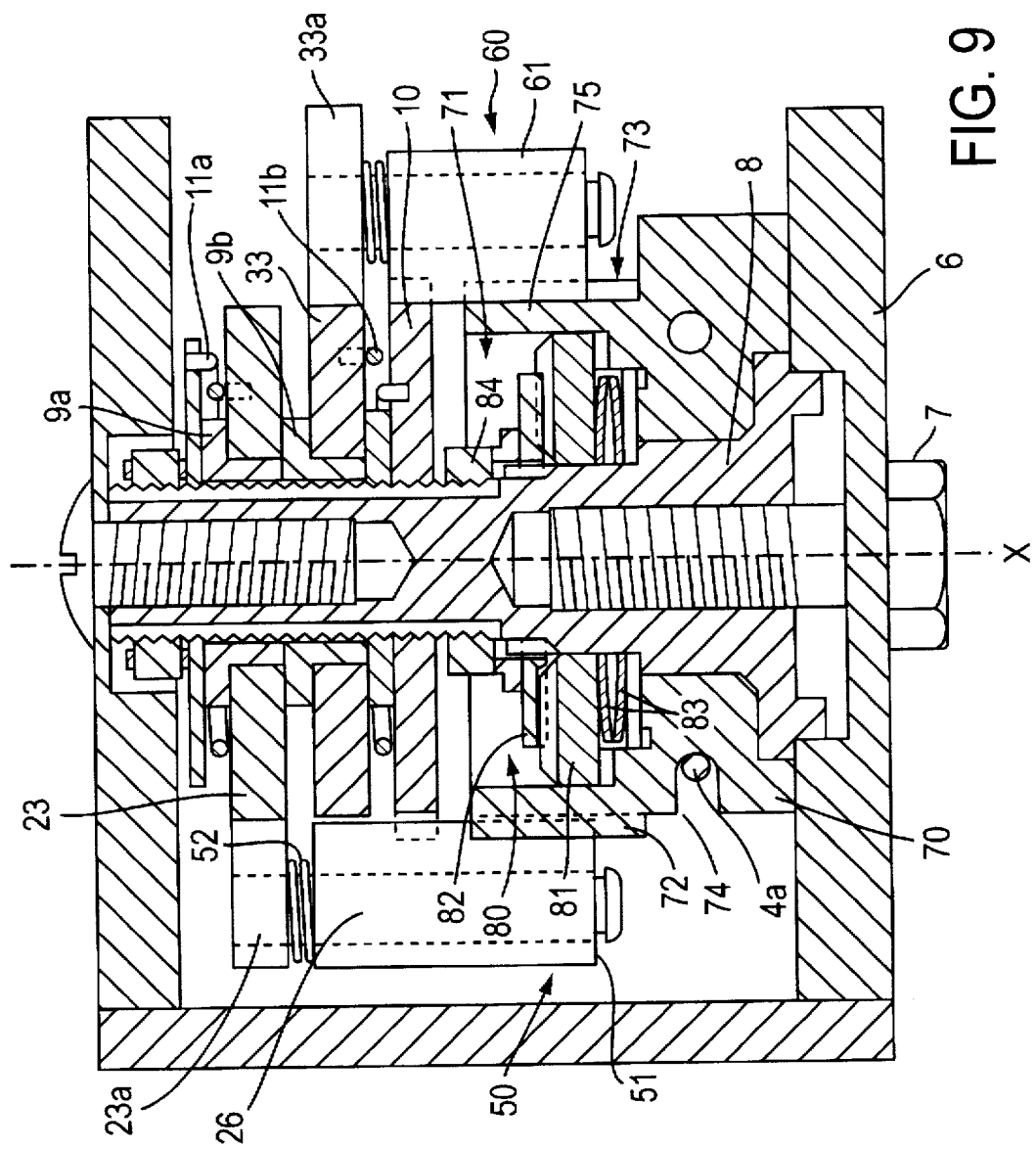
FIG. 9 is a sectional view of a particular embodiment of the shifter operating mechanism shown in FIG. 8.

FIGS. 8–10 illustrate an alternative embodiment of a shift operating device 5' according to the present invention. This embodiment is similar to the first embodiment, but in this embodiment both operating body 20' and operating body 30' operate by a pivoting displacement around axis X. This is accomplished by constructing operating body 20' as shown in FIGS. 9 and 10, which is substantially the same as the construction of operating body 30 in the first embodiment. The operation of operating body 20' is also substantially the same as the operation of operating body 30 in the first embodiment. Thus, pivoting of operating body 20' in the direction of arrow 90 causes take-up body 70 to rotate in the cable take-up direction, and pivoting of operating body 30' in the direction of arrow 94 causes take-up body 70 to rotate in the cable pay out direction. Both operating bodies 20' and 30' automatically return to the home position when the thumb of the cyclist is removed as in the first embodiment.

To make a more compact structure, operating body 20' has an arcuate inner surface 96 facing operating body 30' for accommodating the handlebar 1, and operating body 30' has an arcuate inner surface 98 facing the operating body 20' for accommodating the handlebar 1. Such a construction also allows the finger contact part 22 to be placed directly adjacent to finger contact part 33.

While the above is a description of various embodiments of the present invention, further modifications may be employed without departing from the spirit and scope of the present invention. For example, operating body 20 or 20' may cause take-up body 70 to rotate in the cable pay out direction, and operating body 30 or 30' may cause take-up body 70 to rotate in the cable take-up direction. If desired, operating body 20 may be constructed for pivoting displacement, and operating body 30 may be constructed for sliding displacement. In the second embodiment shown in FIGS. 8–10, the cable take-up mechanism may be replaced by a mechanism such as that disclosed in U.S. Pat. No. 5,203,213, incorporated herein by reference, or any number of take-up mechanisms where the levers operate in different directions.

Thus, the scope of the invention should not be limited by the specific structures disclosed. Instead, the true scope of the invention should be determined by the following claims. Of course, although labeling symbols are used in the claims in order to facilitate reference to the figures, the present invention is not intended to be limited to the constructions in the appended figures by such labeling.

What is claimed is:

1. An bicycle shifter operating device (5) for operating a shifter via a transmission element (4) comprising:

a control body (70) for mounting to a bicycle in close proximity to a handlebar (1) for controlling a pulling and releasing of the transmission element (4);

a first lever (20,20') mounted to the control body (70) for movement which causes the control body (70) to effect pulling of the transmission element (4);

a second lever (30,30') mounted to the control body (70) for movement which causes the control body (70) to effect releasing of the transmission element (4); and wherein the first lever (20,20') and the second lever (30,30') are mounted to the control body (70) so that the handlebar (1) is disposed between the first lever (20, 20') and the second lever (30,30') when the shifter operating device (5) is mounted to the bicycle.

2. The device according to claim 1 wherein the first lever (20,20') is mounted to the control body (70) so that movement of the first lever (20,20') in a first direction causes the control body (70) to effect pulling of the transmission element (4), wherein the second lever (30,30') is mounted to the control body (70) so that movement of the second lever (30,30') in a second direction causes the control body (70) to effect releasing of the transmission element (4), and wherein the first direction is different from the second direction.

9

3. The device according to claim 2 wherein one of the first lever (20) or the second lever (30) is coupled to the control body (70) for linear movement relative to the control body (70), and wherein the other one of the first lever (20) or the second lever (30) is coupled to the control body (70) for pivoting movement relative to the control body (70).

4. The device according to claim 3 wherein the one of the first lever (20) or the second lever (20) is coupled to the control body (70) for movement along a longitudinal axis of the one of the first lever (20) or the second lever (30).

5. The device according to claim 4 wherein the control body (70) is rotatably mounted to the shifter operating device (5), and wherein the other one of the first lever (20) or the second lever (30) is coupled to the control body (70) for pivoting about a rotational axis of the control body.

6. The device according to claim 2 wherein the first lever (20') is coupled to the control body (70) for pivoting movement relative to the control body (70), and wherein the second lever (30') is coupled to the control body (70) for pivoting movement relative to the control body (70).

7. The device according to claim 6 wherein the first direction is opposite the second direction.

8. The device according to claim 7 wherein the control body (70) is rotatably mounted to the shifter operating device (5), and wherein the first lever (20') and the second lever (30') are coupled to the control body (70) for pivoting about a rotational axis of the control body (70).

9. The device according to claim 6 wherein the first lever (20') has an arcuate surface facing the second lever (30') for accommodating the handlebar (1), and wherein the second lever (30') has an arcuate surface facing the first lever (20') for accommodating the handlebar (1).

10. A bicycle shifter operating device (5) which operates a shifter via a shifter cable (4), said shifter operating device (5) comprising:

a control body (70) rotatable about an axis (X) for controlling the shifter cable (4);

a first pivoting operating body (20') which forms a first finger contact part (22) in a position distant from the control body (70) and which is coupled to the operating device (5) for pivoting displacement between a first home position and a first shift position;

a second pivoting operating body (30') which forms a second finger contact part (32) in a position distant from the control body (70) and which is coupled to the operating device (5) for pivoting displacement between a second home position and a second shift position;

a first transmission (50) which converts the pivoting displacement of the first pivoting operating body (20') from the first home position to the first shift position into a rotational displacement of the control body (70);

a second transmission (60) which converts the pivoting displacement of the second pivoting operating body (30') from the second home position to the second shift position into a rotational displacement of the control body (70);

10 wherein, when the first pivoting operating body (20') is located at the first home position and the second pivoting operating body (30') is located at the second home position, the first finger contact part (22) is disposed in close proximity to the second finger contact part (32); and wherein the first pivoting operating body (20') and the second pivoting operating body (30') are mounted to the control body (70) so that the handlebar (1) is disposed between the first pivoting operating body (20') and the second pivoting operating body (30') when the shifter operating device (5) is mounted to the bicycle.

11. The device according to claim 10 further comprising:

a first biasing means (11a) for biasing the first pivoting operating body (20') to the first home position; and a second biasing means (11b) for biasing the second pivoting operating body (30') to the second home position.

12. The device according to claim 10 wherein the first pivoting operating body (20') extends away from the axis (X) so that a free end of the first pivoting operating body (20') forms the first finger contact part, and wherein the second pivoting operating body (30') extends away from the axis (X) in the same general direction as the first pivoting operating body (20') so that a free end of the second pivoting operating body (30) forms the second finger contact part (32).

13. The device according to claim 12 wherein the path of motion of the first finger contact part (22) is disposed in substantially the same plane as the path of motion of the second finger contact part (32).

14. The device according to claim 13 wherein the path of motion of the first finger contact part (22) from the first home position to the first shift position is opposite the path of motion of the second finger contact part (32) from the second home position to the second shift position.

15. The device according to claim 10 wherein the control body (70) is supported on a side of a bracket of a brake operating device so, wherein the first pivoting operating body (20') extends above the handlebar on which the brake operating device is mounted, wherein the second pivoting operating body (30') extends below the handlebar, wherein pivoting displacement of one of the first pivoting operating body (20') or the second pivoting operating body (30') causes the control body (70) to effect pulling of the shifter cable (4), and wherein pivoting displacement of the other one of the first pivoting operating body (20') or the second pivoting operating body (30') causes the control body (70) to effect releasing of the shifter cable (4).

16. The device according to claim 10 wherein the first pivoting operating body (20') has an arcuate surface facing the second pivoting operating body (30') for accommodating the handlebar (1), and wherein the second pivoting operating body (30') has an arcuate surface facing the first pivoting operating body (20') for accommodating the handlebar (1).

* * * * *